(12) United States Patent
Cahill et al.

(10) Patent No.: US 9,544,538 B2
(45) Date of Patent: Jan. 10, 2017

(54) SYSTEM AND METHOD FOR PROVIDING A SHARED CANVAS FOR CHAT PARTICIPANT

(75) Inventors: Matt Cahill, San Francisco, CA (US);
Sean Parker, New York, NY (US);
Shawn D. Fanning, San Francisco, CA (US); Joey Liaw, San Francisco, CA (US)

(73) Assignee: Airtime Media, Inc., San Francisco, CA (US)

(*) Notice: Subject to any disclaimer, the term of this patent is extended or adjusted under 35 U.S.C. 154(b) by 242 days.

(21) Appl. No.: 13/472,358

(22) Filed: May 15, 2012

(65) Prior Publication Data
US 2013/0307920 A1   Nov. 21, 2013

(51) Int. Cl.
*H04N 7/14* (2006.01)
*H04N 7/15* (2006.01)

(52) U.S. Cl.
CPC ............... *H04N 7/15* (2013.01); *H04N 7/152* (2013.01)

(58) Field of Classification Search
CPC .... H04L 65/403; H04L 51/32; H04L 12/1813; H04L 51/10; H04L 67/306; H04N 7/15; H04N 21/4788; H04N 7/147; H04N 7/141; H04N 7/157; H04N 7/14; H04N 7/152; H04N 21/812
USPC .... 348/14.01–14.16; 370/260–261; 715/756, 715/758; 709/204
See application file for complete search history.

(56) References Cited

U.S. PATENT DOCUMENTS

| | | | |
|---|---|---|---|
| 7,720,853 B1* | 5/2010 | Siegel et al. | G06Q 10/10 707/754 |
| 2002/0113862 A1 | 8/2002 | Center et al. | |
| 2007/0242066 A1* | 10/2007 | Levy Rosenthal | 345/419 |
| 2010/0245532 A1* | 9/2010 | Kurtz et al. | 348/14.03 |
| 2011/0025819 A1* | 2/2011 | Gorzynski et al. | 348/14.07 |
| 2011/0066924 A1* | 3/2011 | Dorso et al. | 714/776 |
| 2011/0102539 A1* | 5/2011 | Ferren | 348/14.08 |
| 2011/0141219 A1* | 6/2011 | Yeh | 348/14.02 |
| 2011/0270923 A1* | 11/2011 | Jones et al. | G06F 3/0421 709/204 |
| 2011/0271209 A1 | 11/2011 | Jones et al. | |
| 2012/0011454 A1* | 1/2012 | Droz et al. | 715/758 |
| 2012/0281059 A1* | 11/2012 | Chou et al. | 348/14.07 |
| 2013/0147904 A1* | 6/2013 | Vivekanandan et al. | 348/14.08 |
| 2013/0222521 A1* | 8/2013 | Lee et al. | 348/14.02 |

FOREIGN PATENT DOCUMENTS

| | | |
|---|---|---|
| JP | 3587106 B2 | 11/2004 |
| KR | 100316639 B1 | 11/2001 |

OTHER PUBLICATIONS

International Search Report and Written Opinion for International Patent Application No. PCT/US2013/041018, mailed Sep. 13, 2013, 10 pp.

* cited by examiner

*Primary Examiner* — Stella Woo
(74) *Attorney, Agent, or Firm* — Perkins Coie LLP

(57) ABSTRACT

A computer-implemented method and system of providing a video chat experience in a network are described. The method may include: receiving live video stream signals, including audio signals, from a plurality of participants of a live video chat session; combining the live video stream signals into a shared canvas; providing the shared canvas to the plurality of participants, wherein the shared canvas is substantially synchronized among the plurality of partici- (Continued)

pants; and providing options for the specific chat participant to manipulate the shared canvas.

33 Claims, 9 Drawing Sheets

SYSTEM AND METHOD FOR PROVIDING A SHARED CANVAS FOR CHAT PARTICIPANT

FIELD OF THE INVENTION

At least one embodiment of the present disclosure pertains to facilitating communications over a web-based network, and more particularly, to communications between video chat participants of a network.

BACKGROUND

In recent years, web-based social networking is exploding. Facebook©, a social networking service company, reported in April 2012, that it had 901 million monthly active users ("MAUs") as of Mar. 31, 2012, which is an increase of 33% from Mar. 21, 2011. On average in March 2012, there were 526 million daily active users ("DAUs") on Facebook®.

However, existing video enabled services are still far away from reaching the full potential of video enabled chats. In consequence, the present inventors have recognized that there is value and a need in providing a shared canvas to video chat participants of a live video chat session for a new and different video chat experience.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
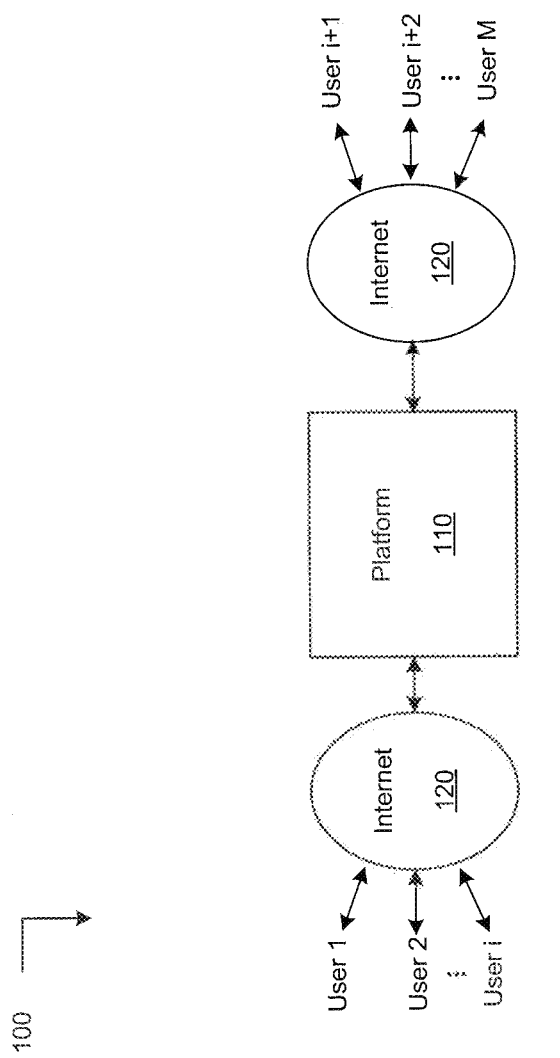
FIG. 1 illustrates a schematic block diagram of a system for facilitating video chat over a network according to one embodiment(s) of the present disclosure.

The following description and drawings are illustrative and are not to be construed as limiting. Numerous specific details are described to provide a thorough understanding of the disclosure. However, in certain instances, well-known or details are not described in order to avoid obscuring the description. References to one or an embodiment in the present disclosure can be, but not necessarily are, references to the same embodiment. Such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 illustrates a schematic block diagram of a system 100 for facilitating video enabled chat over Internet 120, according to one embodiment(s) of the present disclosure.

The system 100 may include a platform 110. The platform 110 may include one or more server computers that are coupled to Internet 120. Each server computer may have one or more IP addresses. In some embodiments, the multiple server computers may be located at the same physical location. In some embodiments, the multiple server computers may be located at multiple physical locations.

In the platform 110, each new user may be provided an option(s) to generate a user profile. The user profile may include, by way of example, but not limitation, the personal information, likes/interests, physical address, etc. In some implementations, the user may be provided an option(s) to connect the user profile to user's existing social media account(s), such as the user's Facebook® account, Google® account, Tagged® account, Quepasa® account, Twitter® account, Spotify® account, MyYearBook® account, and/or Pinterest® account etc. The platform 110 may be configured to automatically update the user profile in the platform 110 by bringing in updates of the user's Facebook® account, and/or Google® account etc.

In some embodiments, the platform 110 may be configured to provide a video chat interface for a user to initiate or join a video chat session. In some implementations, the platform 110 may be further configured to provide a plurality of video chat options to the user. The plurality of video chat options may include functions such as call, accept, block, pause, hold, resume, redial, video on, video off, audio on, audio off, and redial. In some embodiments, a separate chat log may be provided to chat participants of a live video chat session. The chat log may be configured for chat participants of the live video chat session to exchange text messages. The chat log is substantially synchronized among all chat participants. In some implementations, setting and profile changes (e.g. "likes") of each chat participant of the live video chat session may be printed on the chat log in real time. In some implementations, the platform 110 may be configured to provide an "undo" link associated with any action that a specific chat participant may conduct in the platform 110. By double-clicking the "undo" link, the specific chat participant may undo the action associated with the "undo" link.

In some embodiments, the platform 110 may be configured to receive live video stream signals from a plurality of chat participants of a video chat session. The live video stream signals may be generated on chat participants' user devices, such as a personal computer (PC), a tablet PC, a laptop computer, a set-top box (STB), a personal digital assistant (PDA), a cellular telephone, an iPhone®, an iPad®, an Android device, and other tablet devices etc. The platform 110 may be configured to combine the live video stream signals into a shared canvas. The shared canvas may comprise a plurality of regions. Each of the plurality of regions corresponds to live video stream signals from a specific chat participant. The plurality of regions may be configured in a two-dimensional layout or a one-dimensional layout (e.g. a horizontal layout or a vertical layout). In some implementations, chat participants may be provided options to swap their corresponding regions in the shared canvas. Take for an example of a shared canvas configured with a horizontal layout. Each of the plurality of regions, which corresponds to live video stream signals from a specific chat participant, may have a fixed height and a variable width. The aspect ratio of each region may be increased to spare space in the shared canvas when a new chat participant joins the live video chat session, or be decreased when a chat participant leaves the video chat session.

In some embodiments, a specific chat participant may be provided options to manipulate the shared canvas of a live video chat session. For example, the specific chat participant may add, remove or modify elements in the shared canvas. In some implementations, a specific chat participant may be provided options to modify a background of the shared canvas. The specific chat participant may add a picture and/or a video onto the background of the shared canvas. The changes to the shared canvas may be substantially synchronized to all chat participants of the video chat session.

In some embodiments, the platform 110 may be configured to provide options for a specific chat participant of a video chat session to interact with other chat participants in the shared canvas of a live video chat session. Chat participants may simultaneously perform a group activity as if they were at the same physical venue. For example, two video chat participants may simultaneously "bring" their hands to boundary areas of their corresponding video frames. In the shared canvas, it may appear that the two chat participants had "touched" hands or performed "high five."

In some embodiments, the platform 110 may be configured to provide a plurality of virtual objects to chat participants of a live video chat session. A specific chat participant may select one or more virtual objects from the plurality of virtual objects to play with other chat participants within the shared canvas. The virtual objects can be animated objects, images of real items, or any suitable image. In some implementations, a virtual object may change colors, shapes, sizes etc when it moves across regions or near boundary areas of a region in the shared canvas. Each region corresponds to live video stream signals from a specific chat participant. In some implementations, the background of the shared canvas may be animated.

In some embodiments, the platform 110 may be configured to allow a specific chat participant of a video chat session to play games with other chat participants in the shared canvas of a live video chat session. The games may include, but not limited to, a hangman game, chess, drawing pictures together, Hollywood of Squares™, Halo™, Gears of War™, charades, etc. In some implementations, a specific chat participant may be provided options to drop a virtual object (e.g. a ball) into the shared canvas. The specific chat participant may "throw" or "kick" the virtual object to other chat participants as if all chat participants were playing the virtual object at the same physical venue.

In some embodiments, the platform 110 may be configured to provide video stabilization options for video chat participants. A specific chat participant may activate the options prior to or during a live video chat session so that the specific chat participant's face can be kept substantially at the center of the corresponding video frame. In some implementations, areas of the video stream frame that is outside a face and/or a body of the specific chat participant may be cropped and replaced with a background of the shared canvas.

In some embodiments, a processor(s) of the platform 110 may be configured to execute programs to record and monitor a specific chat participant's behavior in the platform 110. For example, the length of the specific chat participant's conversations and the common interests between the specific chat participant and his/her chat partners may be monitored, recorded, and analyzed.

In some embodiments, the platform 110 may be configured to examine a specific chat participant's profile to select one or more advertisements to display to the specific chat participant according to the pattern of his or her profile. The advertisement(s) may be non-intrusively displayed on user interface(s) after the specific chat participant's login. In some embodiments, the advertisement(s) may be displayed close to the shared canvas of a live video chat session on user interface(s) of the specific chat participant.

Figure 2:
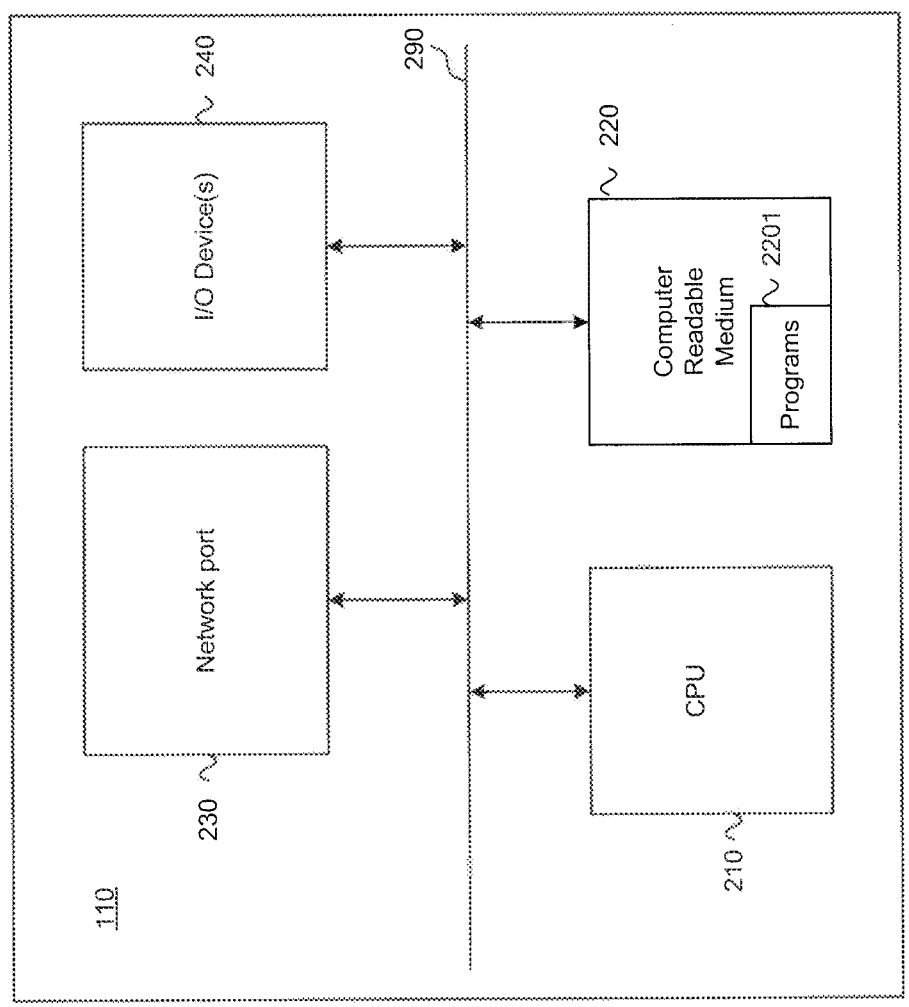
FIG. 2 illustrates a schematic block diagram of a platform for facilitating video chat over a network according to another embodiment(s) of the present disclosure.

FIG. 2 illustrates a schematic block diagram of a platform 110 for facilitating video enabled chat over a network according to another embodiment(s) of the present disclosure. The platform 110 may include, but not limited to, one or more server computers. Each server computer may include at least a processor or a central processor unit ("CPU") 210, one or more network port 230, one or more input/output (I/O) devices 240 such as a keyboard, touch screen or other touch input device, a display, speakers, printer, a camera, a microphone, etc., and one or more computer-readable medium 220, all interconnected via one or more internal bus 290. Each server computer preferably may include an operating system, such as but not limited to Windows™, Linux™, or Unix™. The computer-readable medium 220 may be any medium device that is configured to store data, such as a hard drive, RAM, ROM, flash memory, electrically erasable program read-only memory (EEPROM), CD-ROM, digital versatile disks (DVD), or the like.

Programs 2201 may be stored on one or more computer-readable medium 220. The programs 2201, when executed by the processor(s) 210, may cause the processor(s) 210 to perform certain operations. In some implementations, the operations may include, but not limited to, receiving live video stream signals, which includes audio signals, from a plurality of chat participants of a live video chat session, combining the live video stream signals into a shared canvas, providing the shared canvas to the plurality of chat participants, in which the shared canvas is substantially synchronized between the plurality of chat participants, and providing options for the specific chat participant to manipulate the shared canvas. In some embodiments, the operations may further include providing options for the specific chat participant to interact with other chat participants in the shared canvas.

In some implementations, the operations may include detecting the best camera and microphone on a user device of the specific chat participant, and providing options for the specific chat participant to preview a live video stream from the user device and make necessary adjustment prior to joining the live video chat session.

Figure 3:
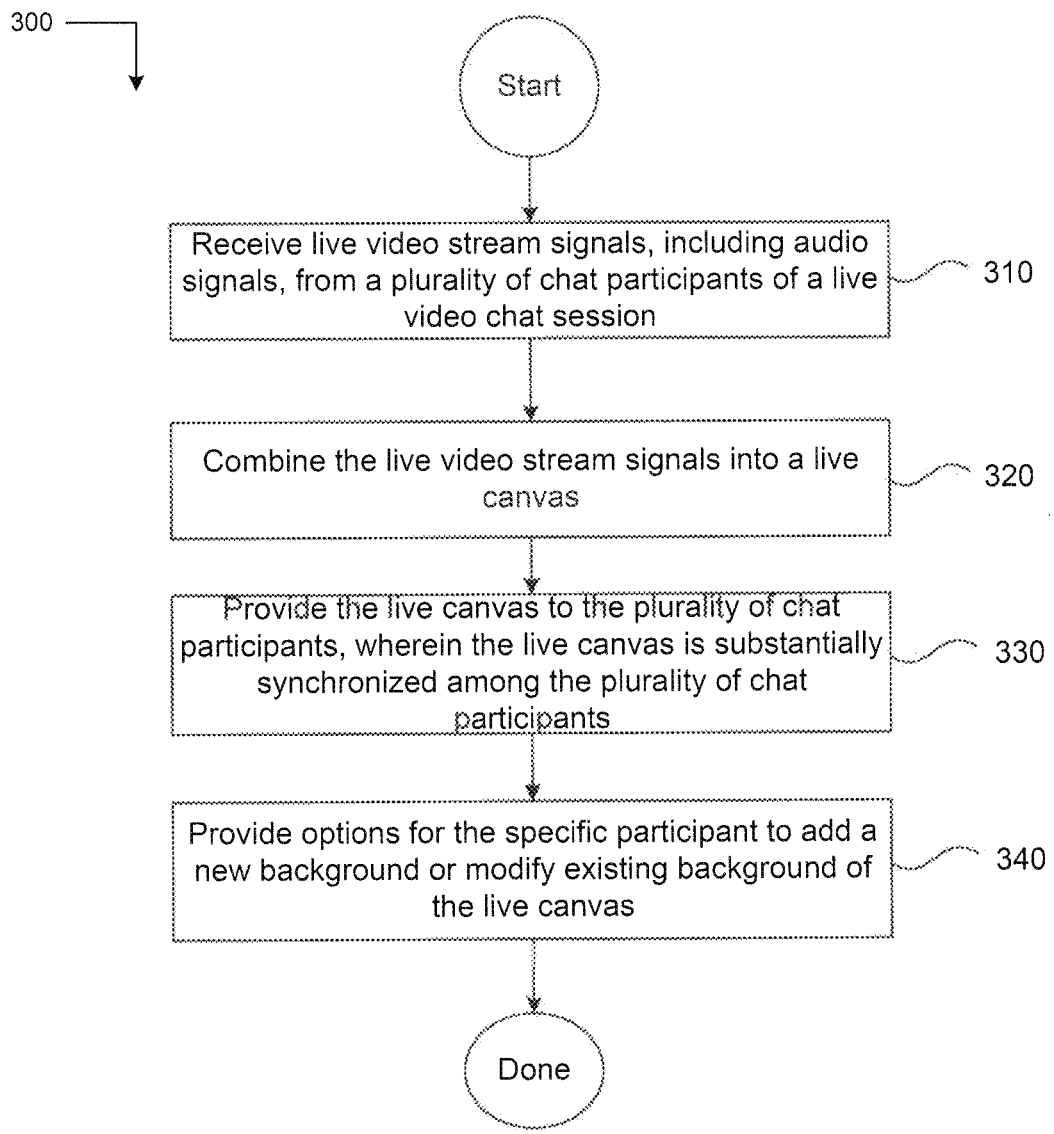
FIG. 3 illustrates a flow diagram of a process for providing a video chat experience for a specific chat participant according to yet another embodiment(s) of the present disclosure.

FIG. 3 illustrates a flow diagram of a process for providing video chat experience for a specific chat participant according to yet another embodiment(s) of the present disclosure. At step 310, live video streams, including audio signals, may be received from a plurality of chat participants of a live video chat session. At step 320, the live video stream signals may be combined into a shared canvas, which is substantially synchronized among the plurality of chat participants. The shared canvas may be provided to the plurality of chat participants at step 330. Options may be provided for the specific chat participant to add or modify the background of the shared canvas at step 330.

In some embodiments, the process may further comprise providing options for the specific chat participant to select a virtual object from a plurality of virtual objects to play with other chat participants of the video chat session in the shared canvas. In some implementations, the process may further comprise providing options for the specific chat participant to select a game from a plurality of games to play with other chat participants in the shared canvas.

In some embodiments, the process may further comprise providing one or more advertisements to display on user interface(s) of the specific chat participant. The one or more advertisements may be selected according to the user profile of the specific chat participant and/or the specific chat participant's activities in the platform 110.

Figure 4:
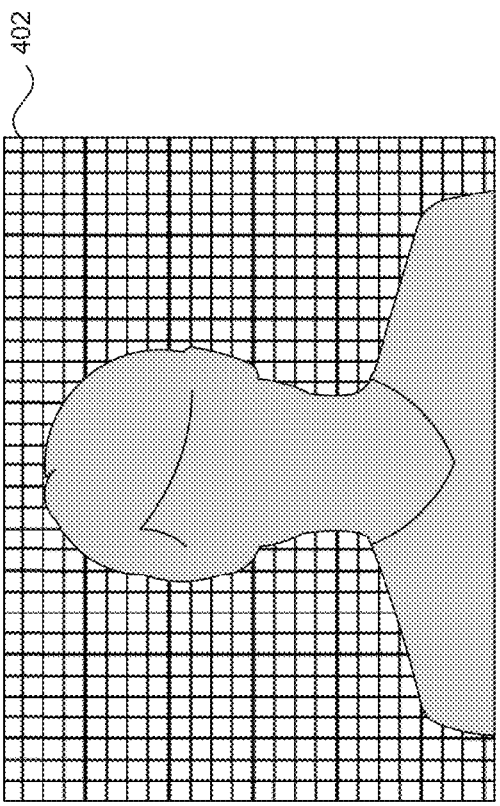
FIG. 4 illustrates an example of user interface showing multiple video stream signals of a live video chat session, according to yet another embodiment(s) of the present disclosure.
Figure 4:
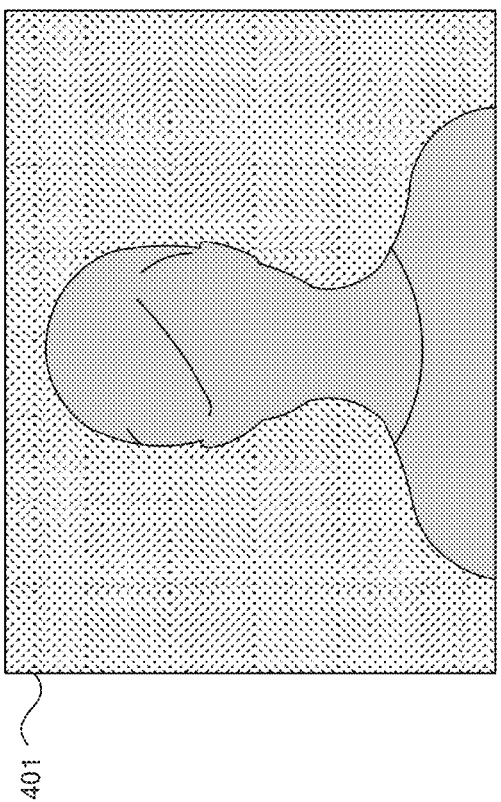

FIG. 4 illustrates an example of user interface showing multiple video stream signals of a live video chat session, according to yet another embodiment(s) of the present disclosure. The platform 110 may be configured to receive a plurality of live video stream signals, including audio signals, from a plurality of participants of the live video chat session (e.g. live video stream signals 401 and 402). Live video stream signals from the plurality of chat participants may have the same background or different backgrounds. Each chat participant may be provided options to preview and/or control the settings of live stream signals from his or her user device(s) prior to joining the live video chat session.

Figure 5:
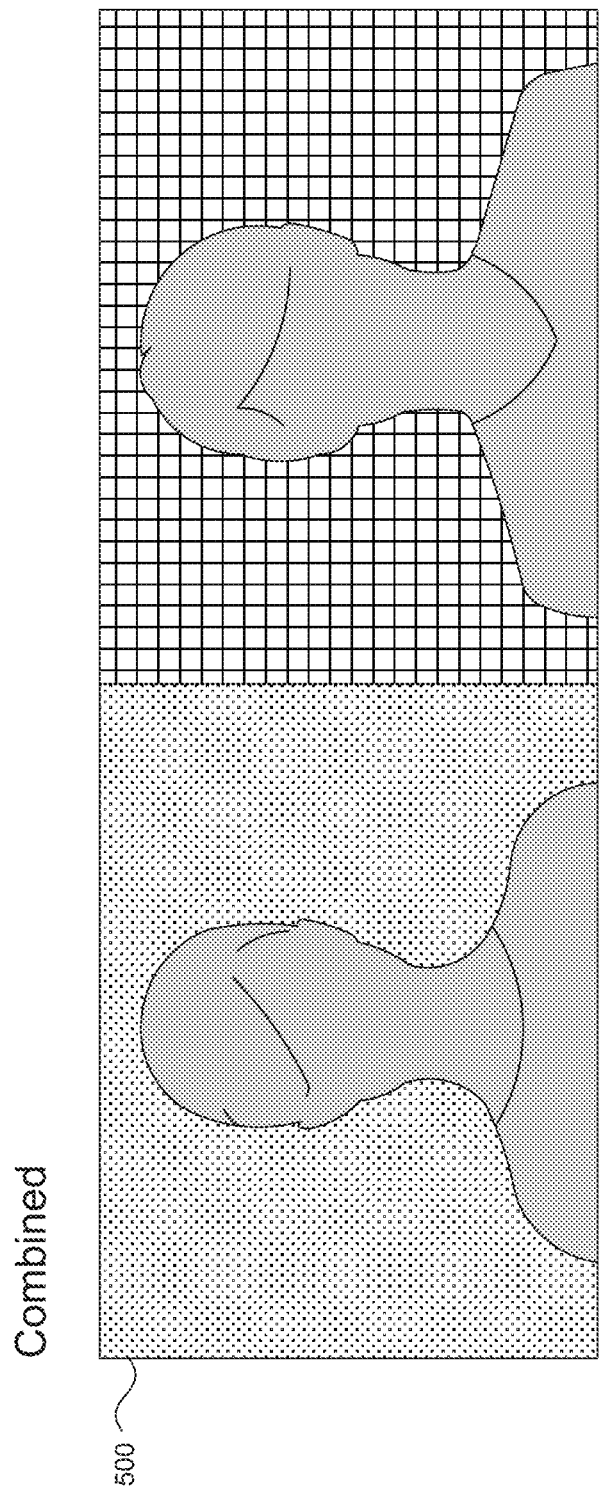
FIG. 5 illustrates an example of user interface showing combined multiple video stream signals of a live video chat session, according to yet another embodiment(s) of the present disclosure.

FIG. 5 illustrates an example of user interface showing combined multiple video stream signals of a live video chat session, according to yet another embodiment(s) of the present disclosure. In some embodiments, the platform 110 may be configured to combine received live video stream signals into a shared canvas. The shared canvas may comprise a plurality of regions, each of which corresponds to live video stream signals from a specific chat participant of the live video chat session. Each of the plurality of regions may have the same height and the same width. In some embodiments, the new canvas may be configured in a two-dimension layout or a one-dimensional layout. For example, the new canvas may be configured in a horizontal layout. Each of the plurality of regions has a fixed height and a variable width.

Figure 6:
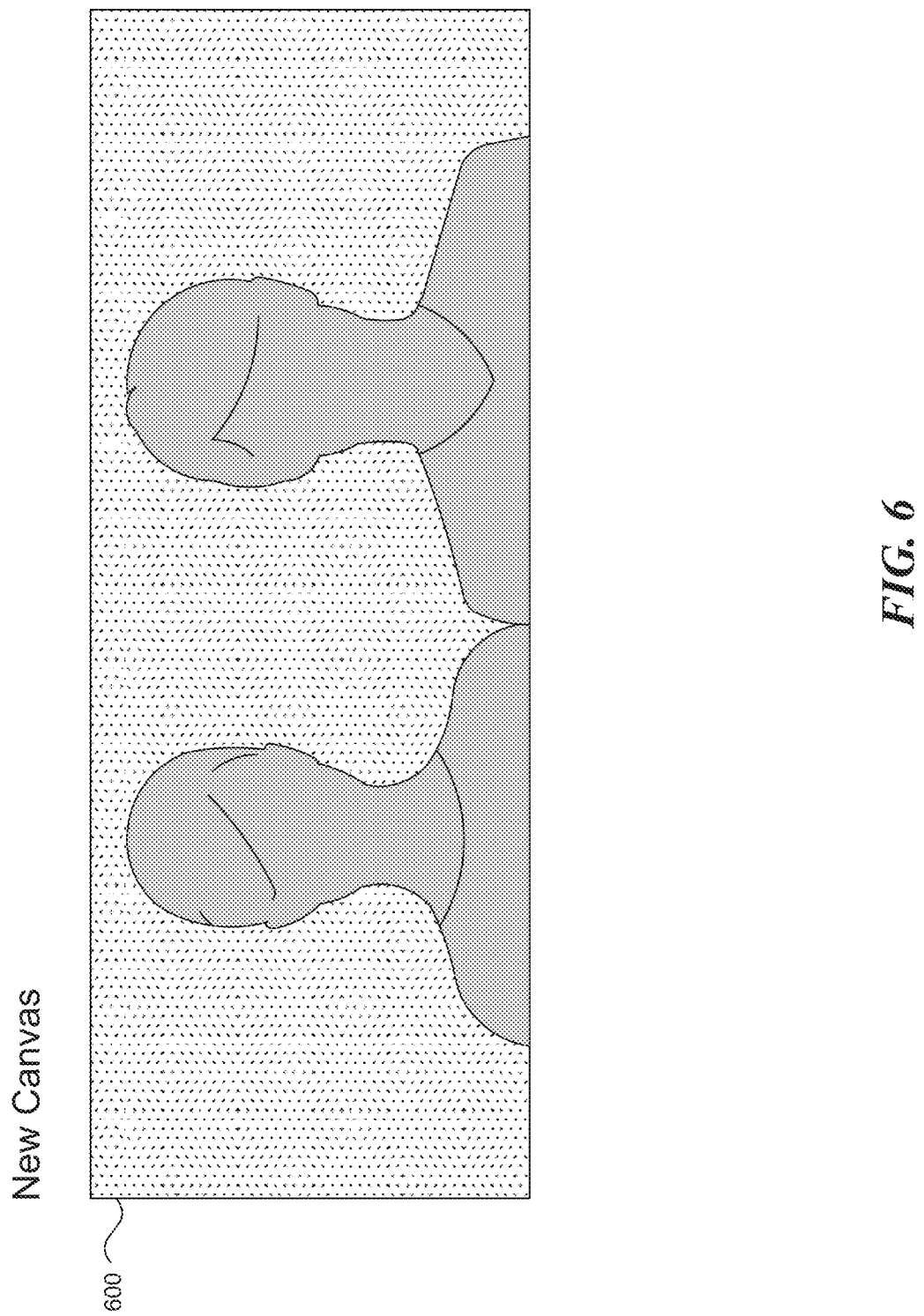
FIG. 6 illustrates an example of user interface showing a shared canvas combined from multiple video stream signals of a live video chat session, according to yet another embodiment(s) of the present disclosure.

FIG. 6 illustrates an example of user interface showing a shared canvas, which is generated by combining multiple video stream signals of a live video chat session, according to yet another embodiment(s) of the present disclosure. In some embodiments, the platform 110 may be configured to crop areas that are outside chat participants' faces and body parts and replace the areas with a background of the shared canvas. In some implementations, the platform 110 may be configured to provide video stabilization options for chat participants of the live video chat session. A specific chat participant may choose to activate the options so that his or her face may be kept substantially at the center of the corresponding region in the shared canvas. In some other implementations, a specific chat participant may choose to disable the options so that he or she may fully utilize all boundary areas of the corresponding region in the shared canvas.

Figure 7:
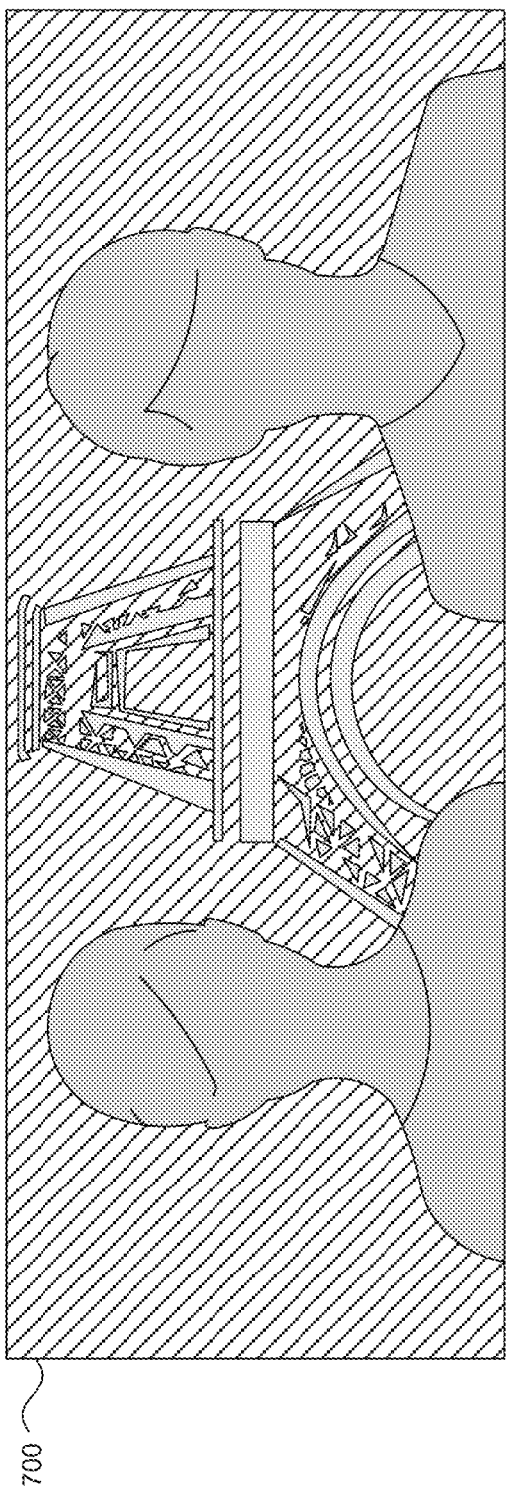
FIG. 7 illustrates an example of user interface showing a new background of the shared canvas illustrated in FIG. 6, which comprises multiple video stream signals of the live video chat session, according to yet another embodiment(s) of the present disclosure.

FIG. 7 illustrates an example of user interface showing a new background of the shared canvas illustrated in FIG. 6, according to yet another embodiment(s) of the present disclosure. In some embodiments, the platform 110 may be configured to allow a specific chat participant of the live video chat session to add a picture and/or a video onto the background of the canvas. The changes to the canvas may be substantially synchronized to other chat participants of the live video chat session.

Figure 8:
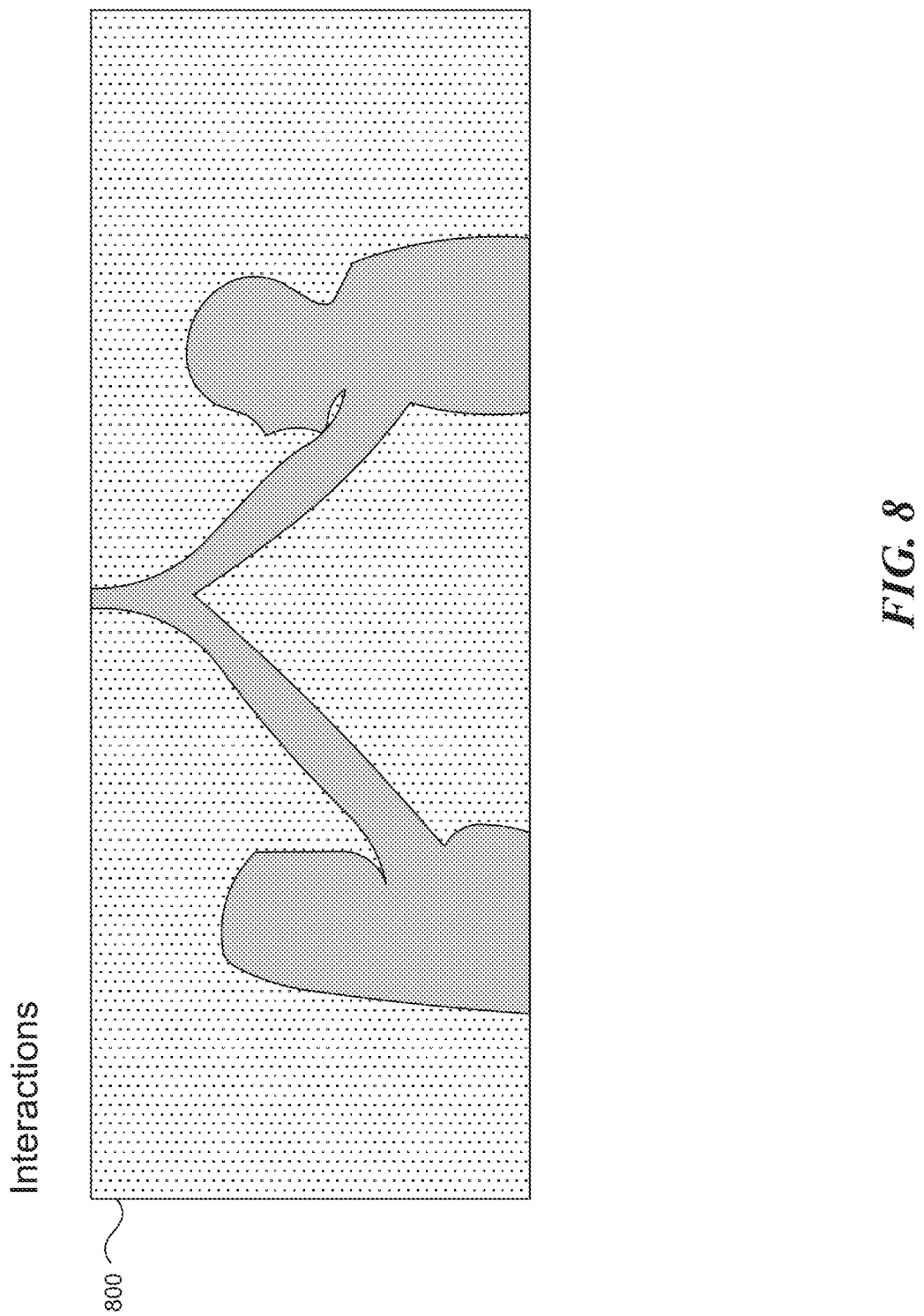
FIG. 8 illustrates an example of user interface showing a shared canvas of a live video chat session, which is configured to allow chat participants to interact with each other in the shared canvas, according to yet another embodiment(s) of the present disclosure.

FIG. 8 illustrates an example of user interface showing a shared canvas, which is configured to allow chat participants to interact with each other in the shared canvas, according to yet another embodiment(s) of the present disclosure. For example, two chat participants may perform "high-five" in the shared canvas by simultaneously "bringing" their hands to boundary areas of their corresponding regions in the shared canvas.

Figure 9:
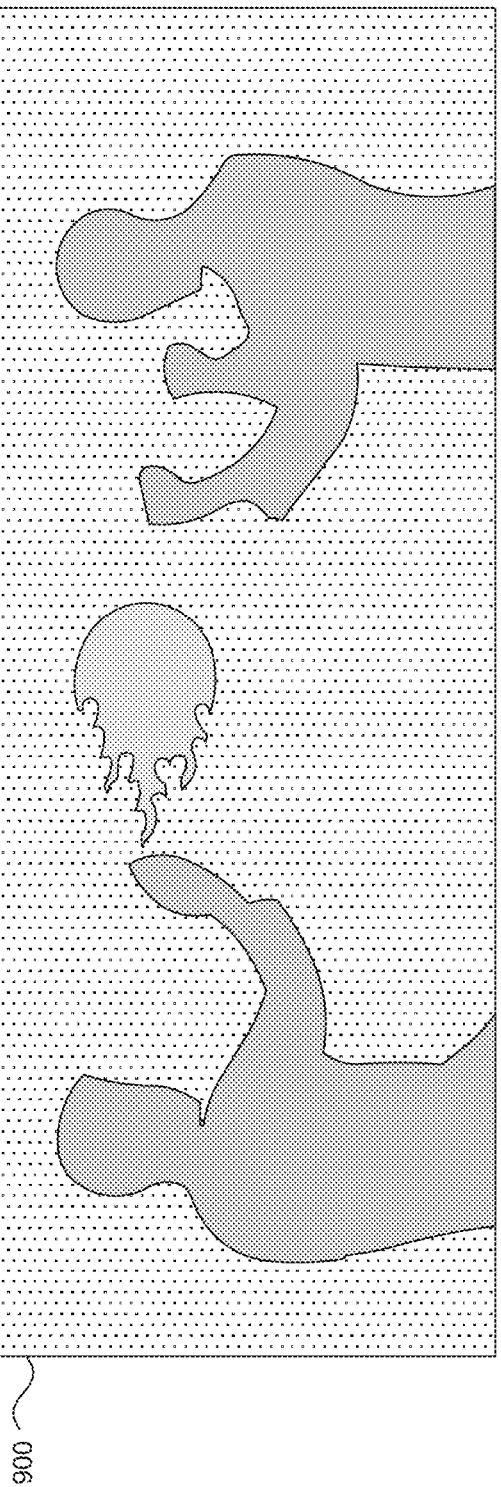
FIG. 9 illustrates an example of user interface showing a shared canvas of a live video chat session, which is configured to allow chat participants to play game(s), share virtual object(s) within the shared canvas and/or engage in other activities in the share canvas, according to yet another embodiment(s) of the present disclosure.

FIG. 9 illustrates an example of user interface showing a shared canvas of a live video chat session, which is configured to allow chat participants to play game(s), share virtual object(s) within the shared canvas or engage in other activities within the shared canvas, according to yet another embodiment(s) of the present disclosure. In some embodiments, the platform 110 may be configured to provide options for chat participants to play games with each other in the shared canvas. The games may include a plurality of group games, which involve two or more players. For example, the games may include, but not limited to, a hangman game, chess, drawing pictures together, Hollywood of Squares™, Halo™, Gears of War™, charades, etc.

In some implementations, the platform 110 may be configured to provide a plurality of virtual objects (e.g. a ball) to chat participants of a live video chat session. A virtual object may be selected and dropped into the shared canvas for chat participants to "throw" or "kick" to each other as if chat participants were playing at the same physical venue.

While the computer-readable medium is shown in an embodiment to be a single medium, the term "computer-readable medium" should be take to include single medium or multiple media (e.g., a centralized or distributed database, and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

The computer may be, but is not limited to, a server computer, a client computer, a personal computer (PC), a tablet PC, a laptop computer, a set-top box (STB), a personal digital assistant (PDA), a cellular telephone, an iPhone®, an iPad®, a processor, a telephone, a web appliance, a network router, switch or bridge, or any machine capable of executing a set of instructions (sequential or otherwise) that specify actions to be taken by that machine.

In general, the routines executed to implement the embodiments of the disclosure may be implemented as part of an operating system or a specific application, component, program, object, module or sequence of instructions referred to as "programs." The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples—alternative implementations may employ differing values or ranges.

The teaching of the disclosure provided herein can be applied to other systems and not necessarily to the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified if necessary to employ the systems, functions, and concepts of the various references described above to provide yet further embodiments of the disclosure.

These and other changes can be made to the disclosure in light of the above Detailed Description. While the above description describes certain embodiments of the disclosure and describes the best mode contemplated, no matter how detailed the above appears in text, the teachings can be practiced in many ways. Details of the system may vary considerably in its implementation details while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computer-implemented method of providing video chat experience for a specific chat participant of a live video chat session in a network, the method comprising:

receiving a plurality of video stream signals, including audio signals, from a plurality of chat participants of the live video chat session;

combining the video stream signals into a shared canvas, the shared canvas providing a representation as if all chat participants are at one physical venue, the shared canvas comprising a plurality of regions, wherein each of the plurality of regions corresponds to video stream signals from a particular chat participant;

providing the shared canvas to the plurality of chat participants, wherein the shared canvas is substantially synchronized among the plurality of chat participants;

providing options for a specific chat participant to manipulate the shared canvas and/or interact with other chat participants of the live video chat session within the shared canvas;

providing a chat log for the specific chat participant to exchange text messages with other chat participants of the live video chat session, wherein the chat log is substantially synchronized among the plurality of chat participants; and printing each of setting and profile changes made by the specific chat participant to the chat log, wherein each of the setting and profile changes is associated with an "undo" link in the chat log.

2. A computer-implemented method as recited in claim 1, further comprising:

providing options for the specific chat participant to preview video stream signals and settings of the video stream signals on user interface(s) of the specific chat participant prior to joining the live video chat session.

3. A computer-implemented method as recited in claim 1, further comprising:

adjusting the size of each of the plurality of regions when a chat participant joins or leaves the live video chat session.

4. A computer-implemented method as recited in claim 1, wherein the plurality of video stream signals are generated by user devices of the plurality of chat participants, the user devices including personal computers (PCs), tablet PCs, laptop computers, set-top boxes (STBs), personal digital assistants (PDAs), cellular telephones, iPhones® and/or iPads®.

5. A computer-implemented method as recited in claim 1, further comprising:

providing video stabilization options for the specific chat participant so that the specific participant's face is kept substantially at the center of the corresponding region in the shared canvas.

6. A computer-implemented method as recited in claim 1, further comprising:

cropping areas outside faces and body parts of the plurality of chat participants; and replacing the areas with a background of the shared canvas.

7. A computer-implemented method as recited in claim 1, further comprising:

providing options for the specific chat participant to add a picture or a video to the background of the shared canvas.

8. A computer-implemented method as recited in claim 1, further comprising:

providing options for the plurality of chat participants to perform one or more group activities together in the shared canvas.

9. A computer-implemented method as recited in claim 8, wherein the one or more group activities include one or more games, each of the one or more games involving two or more players.

10. A computer-implemented method as recited in claim 1, further comprising:

providing options for the plurality of chat participants to select a virtual object from a plurality of virtual objects and drop the virtual object into the shared canvas, wherein the virtual object is configured to be controlled by the specific chat participant when the virtual object is in the corresponding region of the specific chat participant.

11. A computer-implemented method as recited in claim 1, wherein each of the plurality of regions has a similar size and similar dimensions.

12. A computer-implemented method as recited in claim 1, further comprising:

providing options for the specific chat participants to generate a user profile.

13. A computer-implemented method as recited in claim 12, further comprising:

providing options for the specific chat participants to connect the user profile with the specific chat participant's Facebook® account, Google® account, Tagged® account, Quepasa® account, Twitter® account, Spotify® account, MyYearBook® account, and/or Pinterest® account; and updating the user profile of the specific chat participant with updates in the specific chat participant's connected Facebook® account, Google® account, Tagged® account, Quepasa® account, Twitter® account, Spotify® account, MyYearBook® account, and/or Pinterest® account.

14. A computer-implemented method as recited in claim 12, further comprising:

recording activities of the specific chat participant in the live video chat session; and providing an activity pattern of the specific chat participant by analyzing the recorded activities of the specific chat participant over time.

15. A computer-implemented method as recited in claim 14, further comprising:

examining the specific chat participant's user profile and the activity pattern to select one or more advertisements to be displayed to the specific chat participant according to at least a subset of the specific chat participant's user profile and the activity pattern; and displaying the selected one or more advertisements close to the shared canvas on one or more user interface(s) of the specific chat participant.

16. A computer-implemented method as recited in claim 1, wherein the plurality of regions are displayed one next to another horizontally having a fixed height or vertically having a fixed width.

17. A computer-implemented method as recited in claim 1, further comprising providing options for the plurality of chat participants to swap corresponding regions in the shared canvas.

18. An apparatus for providing video chat experience in a social network, the social network having a plurality of users, comprising:

one or more processors, and instructions encoded in one or more computer-readable media wherein the instructions when executed in a platform featuring the one or more processors, cause the platform to perform operations comprising:

receiving a plurality of video stream signals, including audio signals, from a plurality of chat participants of the live video chat session;

combining the video stream signals into a shared canvas, the shared canvas comprising a plurality of regions having a continuous background, wherein each of the plurality of regions corresponds to video stream signals from a particular chat participant;

providing the shared canvas to the plurality of chat participants, wherein the shared canvas is substantially synchronized among the plurality of chat participants; and providing options for a specific chat participant to manipulate the shared canvas or interact with other chat participants of the live video chat session within the shared canvas;

providing a chat log for the specific chat participant to exchange text messages with other chat participants of the live video chat session, wherein the chat log is substantially synchronized among the plurality of chat participants; and printing each of setting and profile changes made by the specific chat participant to the chat log, wherein each of the setting and profile changes is associated with an "undo" link in the chat log.

19. An apparatus recited in claim 18, wherein the operations further comprise:

providing options for the specific chat participant to preview video stream signals and settings of the video stream signals on user interface(s) of the specific chat participant prior to joining the live video chat session.

20. An apparatus recited in claim 18, wherein the operations further comprise:

adjusting the size of each of the plurality of regions when a chat participant joins or leaves the live video chat session.

21. An apparatus recited in claim 18, wherein the plurality of video stream signals are generated by user devices of the plurality of chat participants, the user devices including personal computers (PCs), tablet PCs, laptop computers, set-top boxes (STBs), personal digital assistants (PDAs), cellular telephones, iPhones® and/or iPads®.

22. An apparatus recited in claim 18, wherein the operations further comprise:

providing video stabilization options for the specific chat participant so that the specific participant's face is kept substantially at the center of the corresponding region in the shared canvas.

23. An apparatus recited in claim 18, wherein the operations further comprise:

cropping areas outside faces and body parts of the plurality of chat participants; and replacing the areas with a background of the shared canvas.

24. An apparatus recited in claim 18, wherein the operations further comprise:

providing options for the specific chat participant to add a picture or a video to the background of the shared canvas.

25. An apparatus recited in claim 18, wherein the operations further comprise:

providing options for the plurality of chat participants to perform one or more group activities together in the shared canvas.

26. An apparatus recited in claim 25, wherein the one or more group activities include one or more games, each of the one or more games involving two or more players.

27. An apparatus recited in claim 18, wherein the operations further comprise:

providing options for the plurality of chat participants to select a virtual object from a plurality of virtual objects and drop the virtual object into the shared canvas, wherein the virtual object is configured to be controlled by the specific chat participant when the virtual object is in the corresponding region of the specific chat participant.

28. An apparatus recited in claim 18, wherein each of the plurality of regions has a similar size and similar dimensions.

29. An apparatus recited in claim 18, wherein the operations further comprise:

providing options for the specific chat participants to generate a user profile.

30. An apparatus recited in claim 29, wherein the operations further comprise:

providing options for the specific chat participants to connect the user profile with the specific chat participant's Facebook® account, Google® account, Tagged® account, Quepasa® account, Twitter® account, Spotify® account, MyYearBook® account, and/or Pinterest® account; and updating the user profile of the specific chat participant with updates in the specific chat participant's connected Facebook® account, Google® account, Tagged® account, Quepasa® account, Twitter® account, Spotify® account, MyYearBook® account, and/or Pinterest® account.

31. An apparatus recited in claim 29, wherein the operations further comprise:

recording activities of the specific chat participant in the live video chat session; and providing an activity pattern of the specific chat participant by analyzing the recorded activities of the specific chat participant over time.

32. The apparatus recited in claim 18, wherein the plurality of regions are displayed one next to another horizontally having a fixed height or vertically having a fixed width.

33. The apparatus recited in claim 18, wherein the operations further comprise providing options for the plurality of chat participants to swap corresponding regions in the shared canvas.

* * * * *